(12) United States Patent
Notoya et al.

(10) Patent No.: US 12,138,998 B2
(45) Date of Patent: Nov. 12, 2024

(54) VEHICLE TAILGATE

(71) Applicant: YACHIYO INDUSTRY CO., LTD., Sayama (JP)

(72) Inventors: Sho Notoya, Saitama (JP); Hajime Katayama, Saitama (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/560,837

(22) PCT Filed: Mar. 11, 2022

(86) PCT No.: PCT/JP2022/010885
§ 371 (c)(1),
(2) Date: Nov. 14, 2023

(87) PCT Pub. No.: WO2022/244410
PCT Pub. Date: Nov. 24, 2022

(65) Prior Publication Data
US 2024/0253431 A1 Aug. 1, 2024

(30) Foreign Application Priority Data

May 17, 2021 (JP) ................ 2021-083291

(51) Int. Cl.
*B60J 5/10* (2006.01)
(52) U.S. Cl.
CPC ..................... *B60J 5/10* (2013.01)
(58) Field of Classification Search
CPC ..... B60J 5/10; B60J 5/101; B60J 5/107; B60J 5/044

(Continued)

(56) References Cited

U.S. PATENT DOCUMENTS 10,059,178 B2    8/2018  Miyake et al.
11,634,013 B2 *  4/2023  Kuntze ............ B29C 45/14065
                                                        296/146.6

(Continued)

FOREIGN PATENT DOCUMENTS

CN    106703559 A    5/2017
CN    107009859 A    8/2017

(Continued)

OTHER PUBLICATIONS

PCT International Search Report (with English translation) for corresponding PCT Application No. PCT/JP2022/010885, mailed May 24, 2022, 5 pages.

(Continued)

*Primary Examiner* — Amy R Weisberg
*Assistant Examiner* — Wenwei Zhuo
(74) *Attorney, Agent, or Firm* — Dority & Manning, P.A.

(57) ABSTRACT

A tailgate includes a tailgate main body including a resin inner panel and a resin outer panel forming an inner space between itself and the inner panel; a pair of reinforcement members disposed in the inner space to extend in an up-down direction along both side portions of the tailgate main body, and attached to the inner panel; a functional component disposed in a vehicle widthwise intermediate position in the inner space and attached to the inner panel; and a tether having both ends fixed to the pair of reinforcement members. The functional component has an engagement part that defines an insertion hole for the tether, and the engagement part is formed with a notch that extends from an inner peripheral edge of the insertion hole to hold the tether.

8 Claims, 5 Drawing Sheets

(58) Field of Classification Search
USPC ....... 296/50, 56, 146.5, 146.6, 146.8, 187.11
See application file for complete search history.

(56) References Cited

U.S. PATENT DOCUMENTS

| | | | |
|---|---|---|---|
| 2017/0174057 A1* | 6/2017 | Miyake | B60S 1/0441 |
| 2019/0061649 A1* | 2/2019 | Hilliker | H02G 3/0481 |
| 2020/0354890 A1* | 11/2020 | Kitamura | B29C 48/154 |
| 2023/0182551 A1* | 6/2023 | Nagano | B60J 9/00 296/146.8 |

FOREIGN PATENT DOCUMENTS

| | | | | |
|---|---|---|---|---|
| CN | 108312816 A * | 7/2018 | | B60J 5/107 |
| DE | 102014016205 B4 * | 6/2016 | | B60J 5/0481 |
| EP | 1902884 A1 * | 3/2008 | | B60J 5/107 |
| JP | S5914544 | 1/1984 | | |
| JP | 2004009888 | 1/2004 | | |
| JP | 2004123036 A * | 4/2004 | | |
| JP | 2005014643 | 1/2005 | | |
| JP | 2010159037 A * | 7/2010 | | |
| JP | 2015006826 | 1/2015 | | |
| WO | WO2019006271 | 1/2019 | | |
| WO | WO2019151053 | 8/2019 | | |

OTHER PUBLICATIONS

PCT Written Opinion for corresponding PCT Application No. PCT/JP2022/010885, mailed May 24, 2022, 4 pages.
PCT International Preliminary Report on Patentability (with English translation) for corresponding PCT Application No. PCT/JP2022/010885, completed Sep. 26, 2022, 6 pages.
Chinese Office Action (w/ English translation) for corresponding Application No. 202280033610.4, dated Feb. 24, 2024, 13 pages.

\* cited by examiner

VEHICLE TAILGATE

CROSS REFERENCE TO RELATED APPLICATIONS

This application is the U.S. National Stage entry of International Application No. PCT/JP2022/010885, filed on Mar. 11, 2022, which, in turn, claims priority to Japanese Patent Application No. 2021-083291, filed on May 17, 2021, the disclosures both of which are hereby incorporated herein by reference in their entireties for all purposes.

TECHNICAL FIELD

The present disclosure relates to a vehicle tailgate.

BACKGROUND ART

As a vehicle tailgate (also referred to as a rear gate, a back door, etc.), there is known a tailgate provided with a door main body formed by joining a resin inner panel and a resin outer panel (Patent Document 1). In this tailgate, to suppress deformation of the outer panel that leads to rupture of the outer panel in a rear collision of the vehicle and thereby to suppress fracture and scattering of the outer panel, two cables are provided in an inner space of the door main body. To reinforce the stiffness of the inner panel, these cables are connected to first stiffness members (reinforcement brackets) attached to both vehicle widthwise side portions and a second stiffness member (latch device) attached to a lower end portion of the inner panel by bolts. These cables also function to keep the first stiffness members (reinforcement brackets) and the second stiffness member (latch device) tied up to each other.

PRIOR ART DOCUMENT(S)

Patent Document(s)

Patent Document 1: JP2015-6826A

SUMMARY OF THE INVENTION

Task to be Accomplished by the Invention

However, in the tailgate described in Patent Document 1, two cables and four bolts are necessary to connect the latch member to the pair of reinforcement brackets, and thus, the number of components and the number of assembly steps are large, and this leads to an increase in the manufacturing cost and lowering of the manufacturing efficiency.

In view of the foregoing background, an object of the present invention is to provide a vehicle tailgate which can reduce the number of components and the number of assembly steps and thereby can reduce the manufacturing cost and improve the manufacturing efficiency.

Means to Accomplish the Task

To achieve the above object, one embodiment of the present invention is a tailgate (4) of a vehicle (1), comprising: a tailgate main body (7) including an outer panel (11) made of resin and an inner panel (12) made of resin, the inner panel being joined to the outer panel to form an inner space (22) between itself and the outer panel; a pair of reinforcement members (23) disposed in the inner space to extend in an up-down direction along both side portions of the tailgate main body, and attached to the inner panel; a functional component (15, 25) disposed in a vehicle widthwise intermediate position in the inner space and attached to the inner panel; and a tether (leash, 31) having both ends fixed to the pair of reinforcement members, wherein the functional component has an engagement part (45) that defines an insertion hole (44) for the tether, and the engagement part is formed with a notch (46) that extends from an inner peripheral edge of the insertion hole to hold the tether.

According to this aspect, a single tether is inserted in the insertion hole defined by the engagement part and the both ends thereof are connected to the pair of reinforcement members, whereby the functional component is connected to the pair of reinforcement members. Therefore, compared to the conventional technology, the number of components and the number of assembly steps of the tailgate are reduced, and this can reduce the manufacturing cost and improve the manufacturing efficiency of the tailgate. Also, since the tether is held in the notch formed in the engagement part of the functional component, the tether is prevented from fluttering in the insertion hole due to the vehicle vibration.

In the above aspect, preferably, a part of the notch on a side of the insertion hole is provided with a constriction part (47) having a width smaller than a diameter of the tether.

According to this aspect, the tether is prevented from coming off from the notch and fluttering in the insertion hole.

In the above aspect, preferably, the engagement part includes a pair of engagement pieces (43) provided on both side portions of the functional component.

The longer the distance between the holding parts is, the easier to vibrate the tether is. According to this aspect, the tether is held in the notches of the engagement parts on the both side portions of the functional component, and therefore, the distance between the holding parts of the tether is short and the vibration of the tether is suppressed.

In the above aspect, preferably, the inner panel is integrally formed with a rib (38) that protrudes rearward from a rear surface thereof, and the rib is formed with a rib-side notch (48) that extends forward from a rear edge (38a) thereof to hold the tether.

According to this aspect, the tether is held in the rib-side notch between the engagement part of the functional component and the reinforcement member, and therefore, the vibration of the tether is suppressed.

In the above aspect, preferably, a part of the rib-side notch on a side of the rear edge is provided with a rib-side constriction part (49) having a width smaller than a diameter of the tether.

According to this aspect, the tether is prevented from coming off from the rib-side notch and fluttering.

In the above aspect, preferably, the notch extends forward from a front side of the inner peripheral edge of the insertion hole substantially in parallel with the rib-side notch.

According to this aspect, the tether can be easily attached to and detached from the notch and the rib-side notch.

In the above aspect, preferably, the functional component is a latch device (25) disposed in a lower portion of the inner space.

According to this aspect, since the latch device is connected to the pair of reinforcement members by the tether, scattering of the latch device in a rear collision of the vehicle is suppressed.

In the above aspect, preferably, an upper portion of the tailgate main body is formed with a rear window opening (6), the rear window opening being closed by a rear window panel (8), and the functional component is a wiper device (15) disposed in a vicinity of a lower edge of the rear window opening.

According to this aspect, since the wiper device is connected to the pair of reinforcement members by the tether, scattering of the wiper device in a rear collision of the vehicle is suppressed.

Effect of the Invention

According to the foregoing aspect, it is possible to provide a vehicle tailgate which can reduce the number of components and the number of assembly steps and thereby can reduce the manufacturing cost and improve the manufacturing efficiency.

MODE(S) FOR CARRYING OUT THE INVENTION

In the following, an embodiment of the present invention will be described in detail with reference to the drawings.

Figure 1:
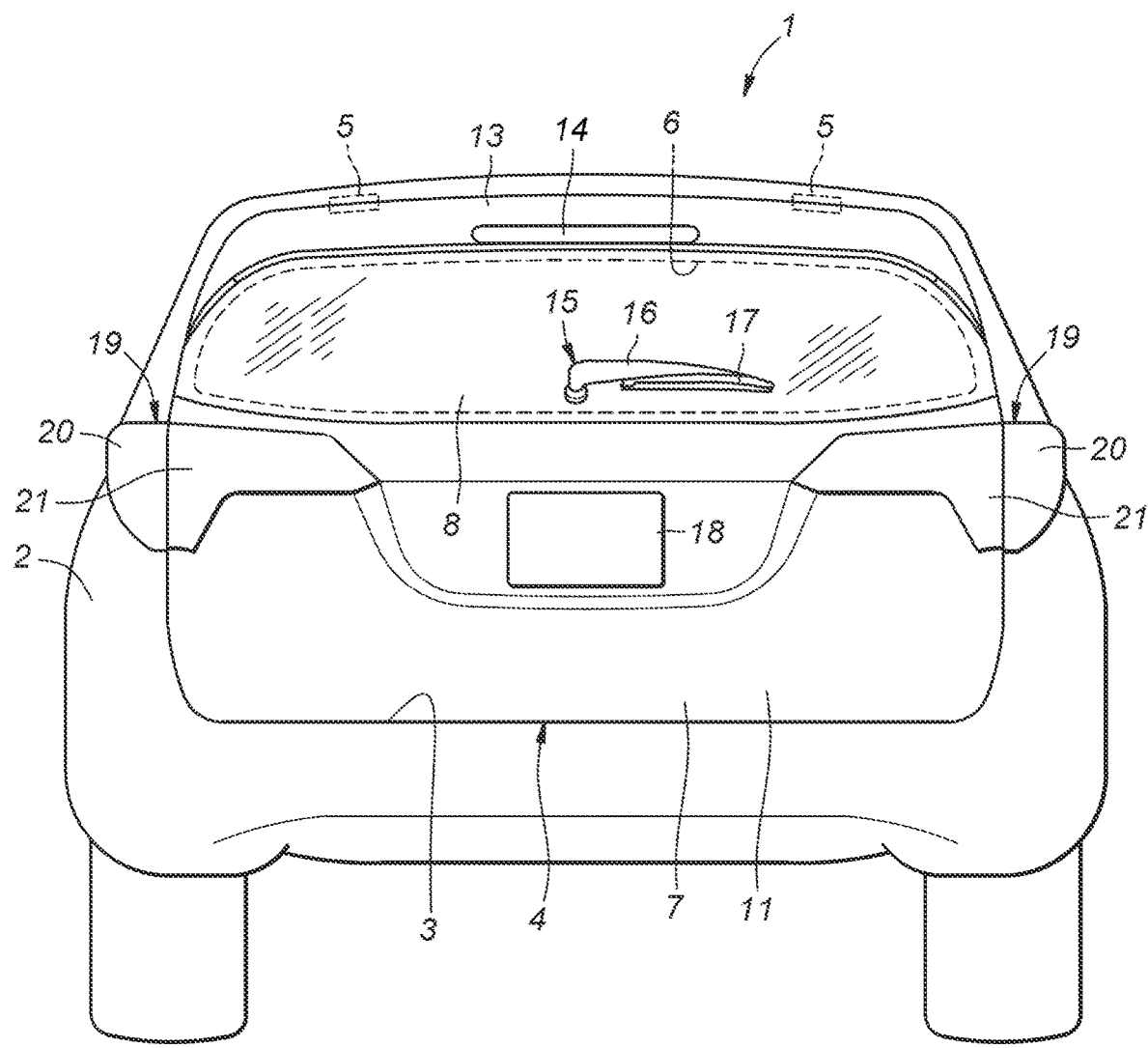
FIG. 1 is a rear view of a vehicle provided with a tailgate according to an embodiment.

FIG. 1 is a rear view of a vehicle 1 provided with a tailgate 4 according to the embodiment. As shown in FIG. 1, the vehicle 1 is a four-wheeled automobile having a propulsion device, such as an engine or a motor, in a vehicle body 2. A rear portion of the vehicle body 2 is formed with a tailgate opening 3. The tailgate opening 3 is selectively opened and closed by a tailgate 4. The tailgate 4 is mounted to the vehicle body 2 by a pair of hinges 5 provided in an upper portion thereof so as to be pivotable about an axis extending in the left-right direction.

The tailgate 4 includes a tailgate main body 7 having a rear window opening 6 formed in an upper portion thereof and a rear window panel 8 closing the rear window opening 6. The rear window panel 8 is a transparent or translucent plate member made of glass, resin, or the like, and is attached to the outer surface of the tailgate main body 7 by an adhesive agent. The tailgate 4 is mounted to the vehicle body 2 such that in a closed state shown in FIG. 1 in which the tailgate 4 closes the tailgate opening 3, the tailgate 4 is in a forward inclined posture in which an upper portion thereof is positioned forward of a lower portion thereof.

The tailgate main body 7 is a hollow structural body formed by joining an outer panel 11 and an inner panel 12 (see FIG. 2), each of which is made of resin, to each other. Here, "made of resin" means that the member is made of materials including resin, and a material other than resin may be included. In the present embodiment, the outer panel 11 and the inner panel 12 are injection molded products made of synthetic resin, and are joined to each other at the outer peripheral portion or the like by an adhesive agent. The joining mode of these members is not limited to this, and they may be joined by friction bonding, ultrasonic bonding, welding by laser or the like, hot-melt adhesion, or mechanical fastening. Since the tailgate main body 7 is formed by the resin outer panel 11 and the inner panel 12 that are joined to each other, the weight is reduced compared to the case where the panels are press molded products made of steel plate.

An upper portion of the tailgate main body 7 is provided with a rear spoiler 13 which protrudes rearward. The rear spoiler 13 is a part integrally formed on the outer panel 11, and protrudes rearward from a part of the tailgate main body 7 above the rear window opening 6. The rear spoiler 13 has a width dimension similar to the width dimension of the tailgate main body 7, and a stop lamp 14 is provided at the widthwise center thereof.

A rear wiper device 15 is provided in an approximate center of the tailgate main body 7, more specifically, in a vehicle widthwise intermediate position of a part of the tailgate main body 7 in the vicinity of the lower edge of the rear window opening 6. The rear wiper device 15 includes a wiper arm 16 pivotably supported on the tailgate main body 7 and a wiper blade 17 pivoted at the tip of the wiper arm 16. Below the rear wiper device 15, a license plate 18 is mounted.

Each side portion of the tailgate main body 7 is provided with a part of a rear combination lamp 19. The rear combination lamp 19 is constituted of a lamp vehicle body part 20 provided on a part of the vehicle body 2 on the side of the tailgate main body 7 and a lamp gate part 21 provided on a side portion of the tailgate main body 7.

Figure 2:
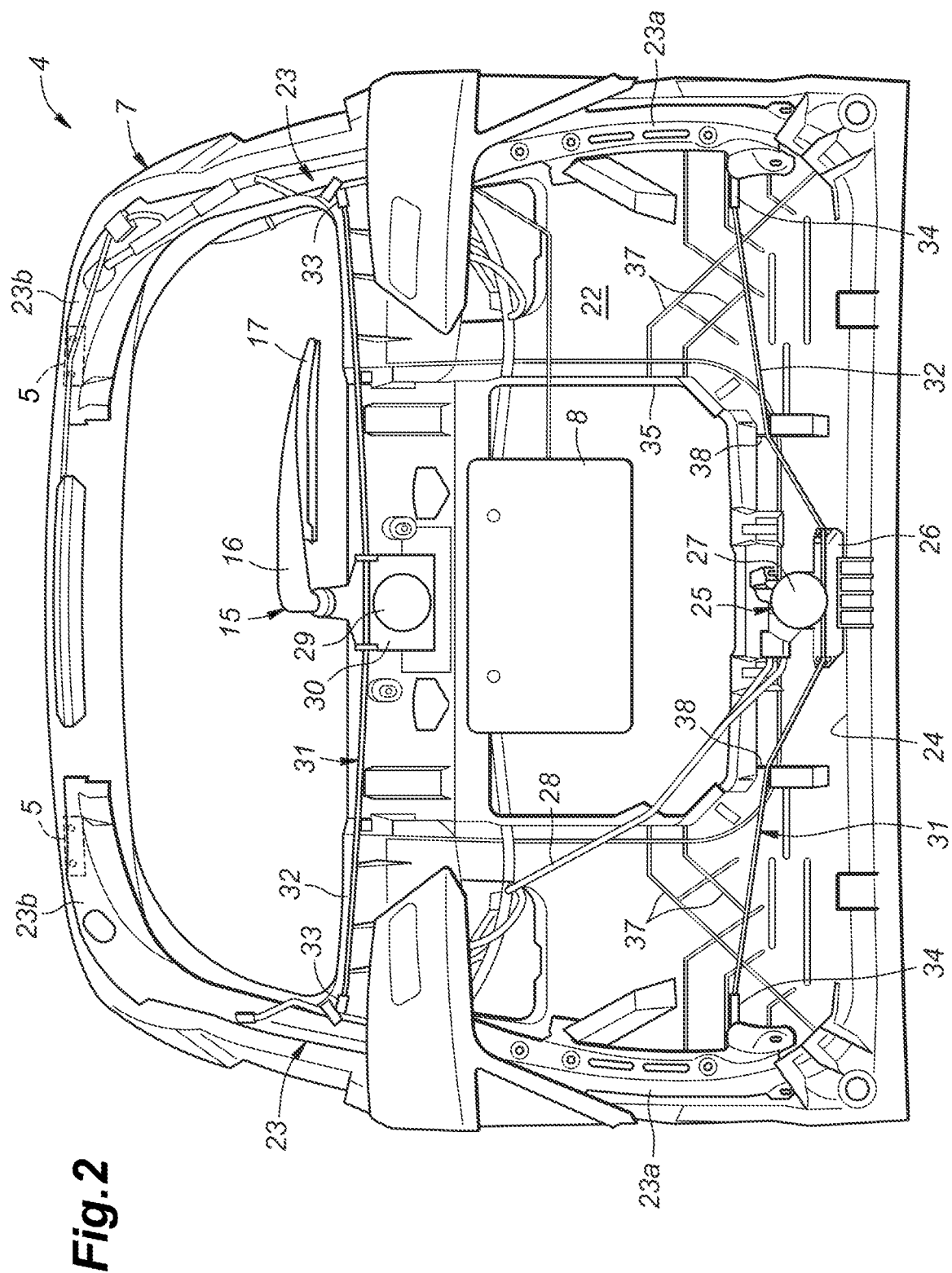
FIG. 2 is a rear view of the tailgate seen through an outer panel.

FIG. 2 is a rear view of the tailgate 4 seen through the outer panel 11. As shown in FIG. 2, an inner space 22 is formed between the inner panel 12 and the outer panel 11 (FIG. 1). A pair of reinforcement members 23 is attached to the rear surfaces of both side portions of the inner panel 12. The pair of reinforcement members 23 is disposed in the inner space 22 of the tailgate main body 7 and is fixed to the inner panel 12 by multiple bolts arranged in appropriate positions. Each reinforcement member 23 is a press molded product made of steel plate, and includes a side portion 23a extending in the up-down direction on a side portion of the tailgate main body 7 and an upper portion 23b extending in the vehicle width direction on an upper portion of the tailgate main body 7. To the upper portion 23b of each reinforcement member 23, a corresponding one of the hinges 5 is fastened, with the inner panel 12 interposed therebetween. The lower end of the side portion 23a of each reinforcement member 23 is positioned slightly higher than the lower end of the inner panel 12. In front of the side portions 23a of the reinforcement members 23 and the inner panel 12, dampers for the tailgate 4 are disposed. To the side portion 23a of each reinforcement member 23, one end of a damper is fastened, with the inner panel 12 interposed therebetween. The other end of the damper is fastened to the vehicle body 2.

The inner panel 12 is provided, in a lower portion thereof, with a bottom wall 24 (see FIG. 3 also) which extends in the front-rear direction and the width direction in the closed state of the tailgate 4 shown in FIG. 1. A latch device 25 is mounted at the widthwise center of the bottom wall 24. The latch device 25 includes a latch base 26 fixed to the bottom wall 24 of the inner panel 12 by bolts and a latch 27 mounted to the latch base 26. The latch 27 is configured to be engaged with a striker fixed to the vehicle body 2. A driving wire 28 is connected to the latch 27 so that when the driving wire 28 is pulled, the engagement of the latch 27 with the striker is released. The latch device 25 is a functional component for locking the tailgate 4 to the vehicle body 2. The latch device 25 is made of metal and has high stiffness and heavy weight.

The rear wiper device 15 further includes a drive source 29 for driving the wiper arm 16 to swing and a wiper base 30 for securing the drive source 29 to the inner panel 12. The drive source 29 is an electric motor and operates by being supplied with electric power from a battery. The drive source 29 is fixed to the wiper base 30 by bolts, and the wiper base 30 is fixed to the inner panel 12 by bolts. The rear wiper device 15 is a functional component that wipes off the dust and water adhered to the outer surface of the rear window panel 8 with the wiper blade 17 when the drive source 29 dries the wiper arm 16 to swing. A large part of the wiper base 30 and the drive source 29 of the rear wiper device 15 is made of metal and has high stiffness and heavy weight.

In the inner space 22 of the tailgate main body 7, two tethers 31 are installed to prevent scattering of the latch device 25 and the rear wiper device 15. Each tether 31 extends in the vehicle width direction, and both ends thereof are connected to the side portions 23*a* of the pair of reinforcement members 23. Each tether 31 is engaged with a corresponding functional component (the latch device 25 or the rear wiper device 15), and connects the functional component to the pair of reinforcement members 23.

The tether 31 includes a main body 32 consisting of a stranded wire (cable) and a pair of mounting brackets 33 provided at both ends of the main body 32 and each having a bolt insertion hole. With each mounting bracket 33 being fixed to the corresponding reinforcement member 23 by a mounting bolt 34 (see FIG. 3), the tether 31 is installed to extend between the pair of reinforcement members 23. The main body 32 of the tether 31 is not limited to a stranded wire and may be a chain or a single wire.

The latch device 25 is connected to the pair of reinforcement members 23 via the tether 31 engaged with the latch base 26. The rear wiper device 15 is connected to the pair of reinforcement members 23 via the tether 31 engaged with the wiper base 30. The engagement structures of the tethers 31 with these base members are similar. In the following, taking the latch base 26 as an example, the engagement structure of the tether 31 will be described. As described above, the engagement structure of the tether 31 with the wiper base 30 is similar to the engagement structure with the latch base 26, and thus, description thereof is omitted here.

Figure 3:
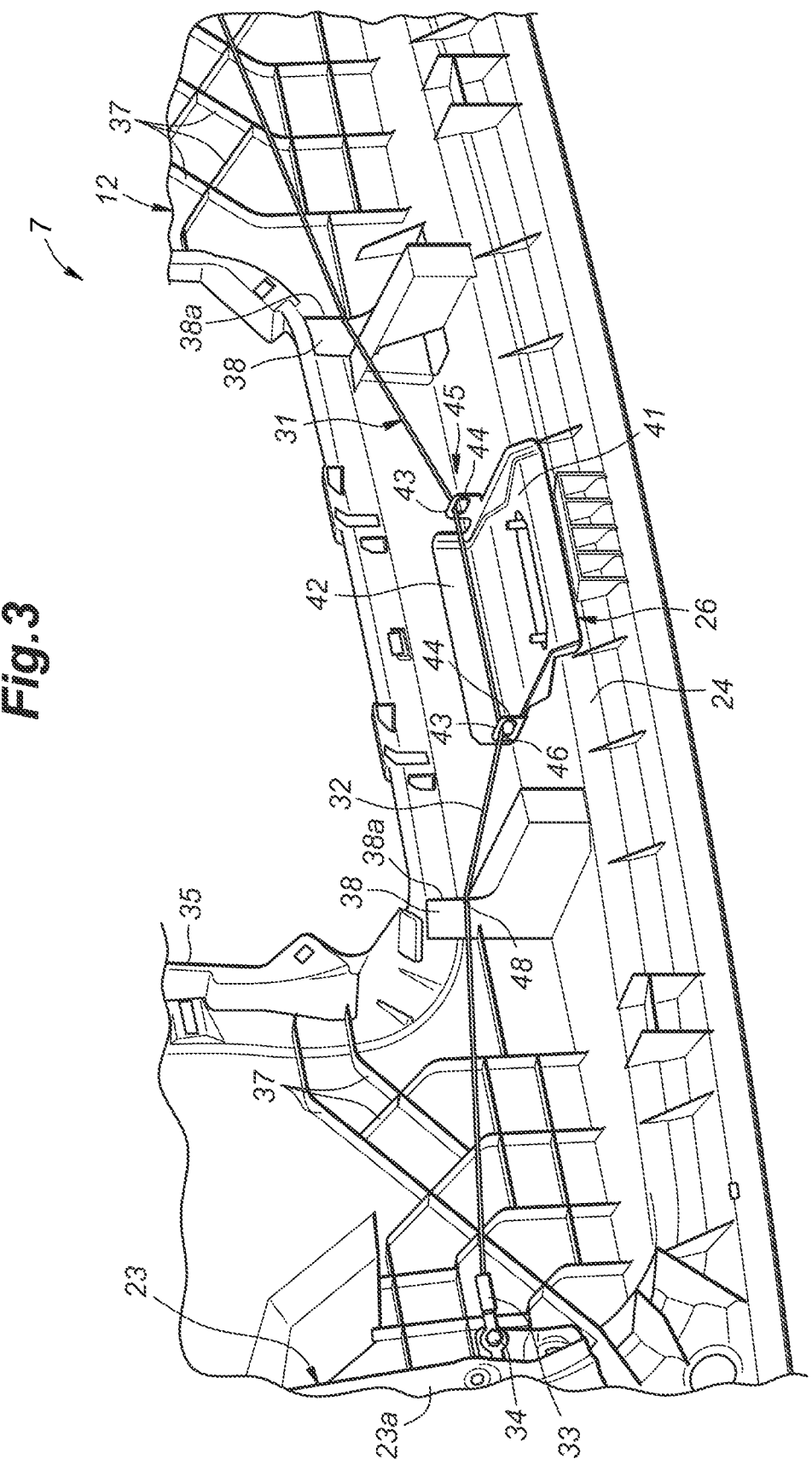
FIG. 3 is a perspective view of a main part of the tailgate shown in FIG. 2.

FIG. 3 is a perspective view of a main part of the tailgate 4 shown in FIG. 2. As shown in FIGS. 2 and 3, a lower portion of the inner panel 12 is formed with a lower opening 35 smaller than the rear window opening 6. The lower opening 35 is positioned below the rear window opening 6 (FIG. 2) and above the bottom wall 24. A part of the inner panel 12 around the lower opening 35 protrudes rearward. The rear surface of the inner panel 12 is formed with multiple small ribs 37. In the vicinity of both side portions of the lower opening 35, a pair of large ribs 38 connecting the lower opening 35 and the bottom wall 24 is formed.

As shown in FIG. 3, the small ribs 37 and the large ribs 38 are integrally formed on the inner panel 12 so as to protrude rearward from the rear surface of the inner panel 12. The protrusion height of the large ribs 38 from the rear surface of the inner panel 12 is greater than the protrusion height of the small ribs 37 from the rear surface.

The latch base 26 includes a main plate part 41 extending substantially in the front-rear direction and the width direction along the bottom wall 24, a front wall 42 standing up from the front edge of the main plate part 41, and a pair of engagement pieces 43 standing up from the both side edges of the main plate part 41 and engaged with the tether 31. Each engagement piece 43 is formed with an insertion hole 44 into which the tether 31 is inserted. The engagement piece 43 has an annular shape to define the insertion hole 44. The two engagement pieces 43 constitute an engagement part 45 that is engaged with the tether 31.

Figure 4:
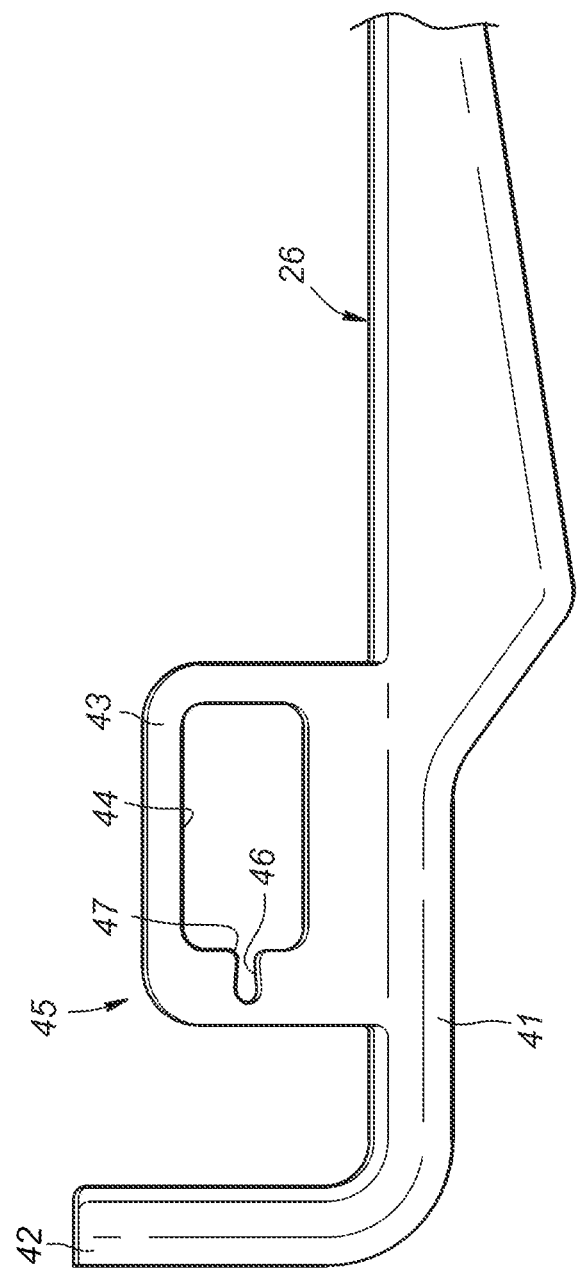
FIG. 4 is an enlarged side view of a latch base shown in FIG. 3.

FIG. 4 is an enlarged side view of the latch base 26 shown in FIG. 3. As shown in FIGS. 3 and 4, each engagement piece 43 is formed with a notch 46 extending forward from the front side of the inner peripheral edge of the insertion hole 44. In the notch 46, the tether 31 (see FIG. 3) is disposed. Thereby, the tether 31 inserted in the insertion hole 44 is held in the notch 46. Therefore, the tether 31 is prevented from fluttering in the insertion hole 44 due to vibration of the vehicle 1 or the like.

A part of the notch 46 on the entrance side, namely, on the side of the insertion hole 44, is formed with a constriction part 47 having a width smaller than the diameter of the main body 32 of the tether 31 (see FIG. 4). After the tether 31 is inserted in each insertion hole 44 and the both ends thereof are fixed to the pair of reinforcement members 23, the tether 31 is pushed into the far side of the notch 46 from the insertion hole 44, beyond the constriction part 47. Thereby, the tether 31 is prevented from coming off from the notch 46 and fluttering in the insertion hole 44.

As described above, the latch device 25 includes the engagement part 45 that defines the insertion hole 44 for the tether 31. And, the engagement part 45 is formed with the notch 46 that extends from the inner peripheral edge of the insertion hole 44 to hold the tether 31. The single tether 31 is inserted in the insertion hole 44 defined by the engagement part 45 and the both ends of the tether 31 are connected to the pair of reinforcement members 23, whereby the latch device 25 is connected to the pair of reinforcement members 23. Therefore, compared to the conventional technology, the number of components and the number of assembly steps of the tailgate 4 are reduced, and this can reduce the manufacturing cost and improve the manufacturing efficiency of the tailgate 4.

Incidentally, the longer the distance between the holding parts is, the easier to vibrate the tether 31 is. In the present embodiment, as described above, the engagement part 45 includes a pair of engagement pieces 43 provided on both side portions of the latch device 25. Due to this configuration, the tether 31 is held in the notches 46 of the engagement parts 45 on the both side portions of the latch device 25, and therefore, the distance between the holding parts of the tether 31 is short and the vibration of the tether 31 is suppressed.

Figure 5:
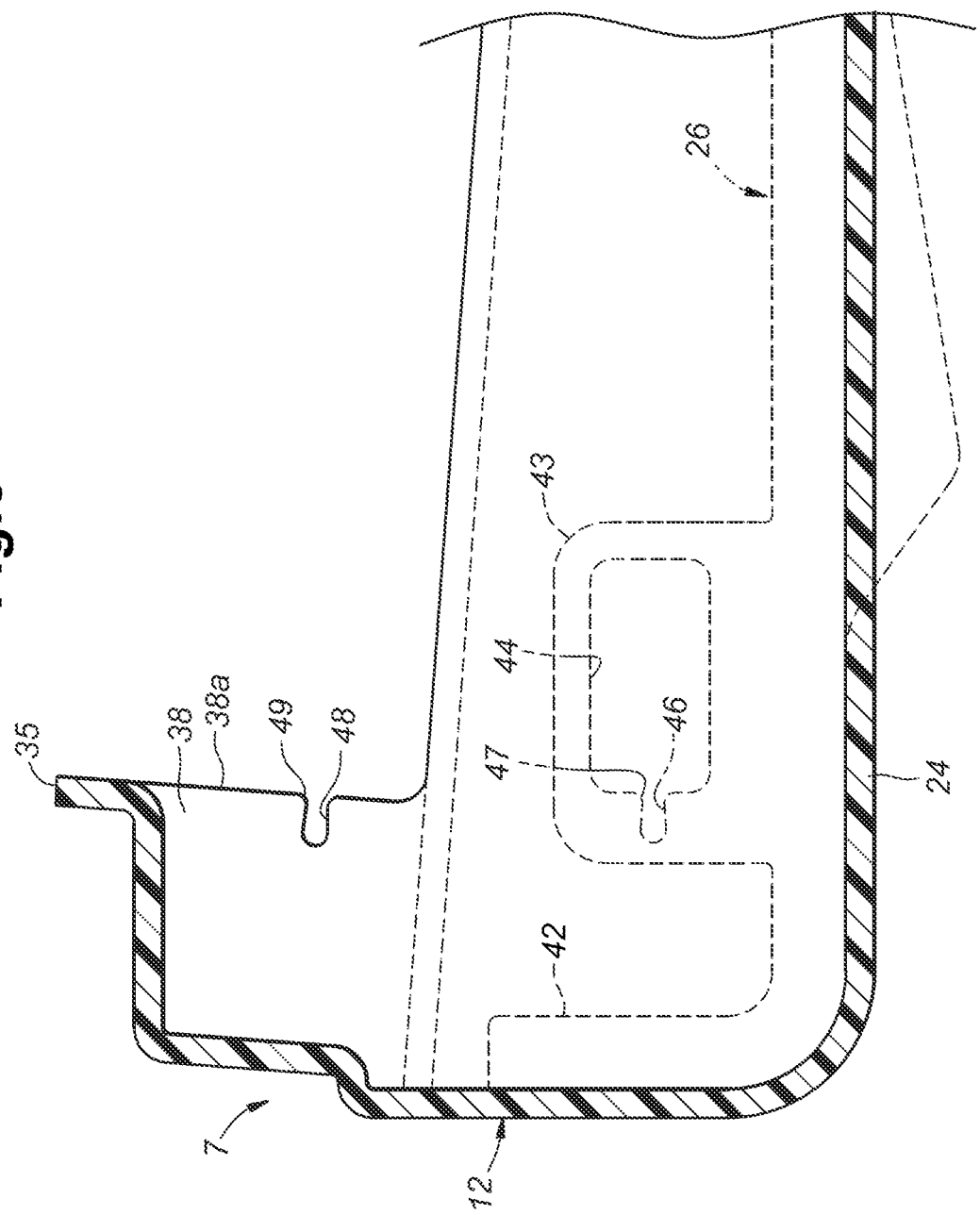
FIG. 5 is an enlarged side view of a large rib shown in FIG. 3.

FIG. 5 is an enlarged side view of the large rib 38 shown in FIG. 3. As shown in FIGS. 3 and 5, each large rib 38 is provided with a rear edge 38*a* extending in the up-down direction. Each large rib 38 is formed with a rib-side notch 48 that extends forward from the rear edge 38*a*. In the rib-side notch 48, the tether 31 (see FIG. 3) is disposed. Thereby, the tether 31 is held in the rib-side notch 48 between each engagement piece 43 of the latch device 25 and the reinforcement member 23 on the corresponding side. Therefore, the vibration of the tether 31 is suppressed.

A part of the rib-side notch 48 on the entrance side, namely, on the side of the rear edge 38*a* of the large rib 38, is formed with a rib-side constriction part 49 having a width smaller than the diameter of the main body 32 of the tether 31 (see FIG. 5). After the both ends are fixed to the pair of reinforcement members 23, the tether 31 is pushed into the far side of the rib-side notch 48 from the rear edge 38*a* of the large rib 38, beyond the rib-side constriction part 49. Thereby, the tether 31 is prevented from coming off from the rib-side notch 48 and fluttering.

The notch 46 of the engagement piece 43 and the rib-side notch 48 extend forward substantially in parallel with each other. With this configuration, the tether 31 can be easily attached to and detached from the notch 46 and the rib-side notch 48.

In this way, the latch device 25 is connected to the pair of reinforcement members 23 by the tether 31. Therefore, scattering of the latch device 25 in a rear collision of the vehicle 1 is suppressed.

Also, the rear wiper device 15 is connected to the pair of reinforcement members 23 by the tether 31 engaged with the wiper base 30 similarly to the engagement structure for the latch base 26. Therefore, scattering of the rear wiper device 15 in a rear collision of the vehicle 1 is suppressed.

Concrete embodiments of the present invention have been described in the foregoing, but the present invention is not limited to the above embodiments and may be modified or altered in various ways. For example, in the above embodiment, each of the latch device 25 and the rear wiper device 15 is connected to the pair of reinforcement members 23 by one tether 31. In another embodiment, another functional component accommodated in the inner space 22 of the tailgate main body 7 may be connected to the pair of reinforcement members 23 by one tether 31. Also, the concrete structure, arrangement, number, material, assembly procedure, or the like of each member or part may be appropriately changed without departing from the spirit of the present invention. On the other hand, not all of the components shown in the above embodiment are necessarily indispensable and they may be selectively adopted as appropriate.

LIST OF REFERENCE NUMERALS

1: vehicle
4: tailgate
6: rear window opening
7: tailgate main body
8: rear window panel
11: outer panel
12: inner panel
15: rear wiper device (functional component)
22: inner space
23: reinforcement member
25: latch device (functional component)
26: latch base
30: wiper base
31: tether
38: large rib
38a: rear edge
43: engagement piece
44: insertion hole
45: engagement part
46: notch
47: constriction part
48: rib-side notch
49: rib-side constriction part

The invention claimed is:

1. A tailgate of a vehicle, comprising:
a tailgate main body including an outer panel made of resin and an inner panel made of resin, the inner panel being joined to the outer panel to form an inner space between itself and the outer panel;
a pair of reinforcement members disposed in the inner space to extend in an up-down direction along both side portions of the tailgate main body, and attached to the inner panel;
a functional component disposed in a vehicle widthwise intermediate position in the inner space and attached to the inner panel; and
a tether having both ends fixed to the pair of reinforcement members,
wherein the functional component has an engagement part that defines an insertion hole for the tether, and the engagement part is formed with a notch that extends from an inner peripheral edge of the insertion hole to hold the tether, and
the tether connects the functional component to the pair of reinforcement members while being inserted in the insertion hole and held in the notch.

2. The tailgate of the vehicle according to claim 1, wherein a part of the notch on a side of the insertion hole is provided with a constriction part having a width smaller than a diameter of the tether.

3. The tailgate of the vehicle according to claim 2, wherein the engagement part includes a pair of engagement pieces provided on both side portions of the functional component.

4. The tailgate of the vehicle according to claim 1, wherein the inner panel is integrally formed with a rib that protrudes rearward from a rear surface thereof, and the rib is formed with a rib-side notch that extends forward from a rear edge thereof to hold the tether.

5. The tailgate of the vehicle according to claim 4, wherein a part of the rib-side notch on a side of the rear edge is provided with a rib-side constriction part having a width smaller than a diameter of the tether.

6. The tailgate of the vehicle according to claim 4, wherein the notch extends forward from a front side of the inner peripheral edge of the insertion hole substantially in parallel with the rib-side notch.

7. The tailgate of the vehicle according to claim 1, wherein the functional component is a latch device disposed in a lower portion of the inner space.

8. The tailgate of the vehicle according to claim 1, wherein an upper portion of the tailgate main body is formed with a rear window opening, the rear window opening being closed by a rear window panel, and
the functional component is a wiper device disposed in a vicinity of a lower edge of the rear window opening.

* * * * *